United States Patent [19]

Barfus-Shanks et al.

[11] Patent Number: 4,786,158
[45] Date of Patent: Nov. 22, 1988

[54] PROTECTIVE COVER FOR EYEGLASS TEMPLE PIECES AND METHOD

[76] Inventors: Glen A. Barfus-Shanks; Irving Barfus, both of 2028 Dracena Dr., Los Angeles, Calif. 90027

[21] Appl. No.: 828,135
[22] Filed: Feb. 10, 1986
[51] Int. Cl.⁴ .................................................. G02C 5/14
[52] U.S. Cl. ...................................... 351/122; 351/111
[58] Field of Search ............... 351/122, 123; 138/109; 264/159

[56] References Cited
U.S. PATENT DOCUMENTS
2,502,734  4/1950  Lyons ................................. 351/122

4,323,089  4/1982  Kadono et al. ..................... 138/109

FOREIGN PATENT DOCUMENTS
637103  6/1973  France ................................. 138/109

*Primary Examiner*—Rodney B. Bovernick
*Attorney, Agent, or Firm*—Erik M. Arnhem

[57] ABSTRACT

A disposable temple cover for use within environments in which the wearer of eyeglasses subjects them to potentially damaging substances includes a thin walled tube of plastic material having an end bearing a soft resilient ring. The resilient ring is attached to the tube by either a folding or rolling method.

5 Claims, 1 Drawing Sheet

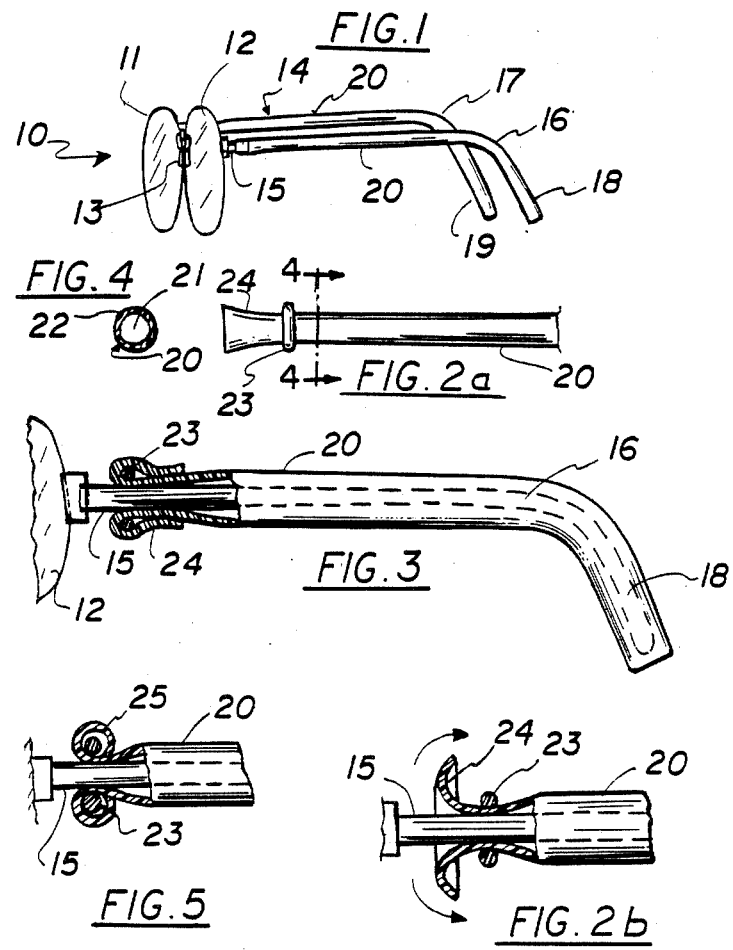

PROTECTIVE COVER FOR EYEGLASS TEMPLE PIECES AND METHOD

BACKGROUND OF THE INVENTION (1) Field of the Invention

This invention relates generally to eyeglasses and particularly to protective covers for the temple pieces of eyeglasses and particularly to a protective cover for use in connection therewith.

(2) Prior Art

Because of the many problems and inconveniences encountered by eyeglass wearers due to the interaction between the temple piece of eyeglasses and the wearer, practitioners in the art of eyeglass design have undertaken the creation of numerous devices directed toward minimizing these problems and inconveniences.

One such structure set forth in U.S. Pat. No. 2,294,840 shows a protective covering member constructed from tubular rubber in a closed-end configuration and which is affixed to the portion of the eyeglass temple piece which engages the wearer behind the ear. The object of U.S. Pat. No. 2,294,840 is to provide a cushioning action between the ear engaging portion of the eyeglass and the skin of the wearer.

Another structure set forth in U.S. Pat. No. 3,156,757 is directed to a tensioning device, the object of which is to provide a retaining force at the eyeglass temple piece hinge. The function of this tensioner is to inhibit the tendency of the eyeglasses to move downward on the nose of the wearer.

U.S. Pat. No. 3,684,356 is directed to a temple boot structure made of a rubber-like material and applied to the ends of the temple piece of the eyeglasses to increase the friction between the eyeglasses and the head of the wearer, and thereby tend to maintain the position of the eyeglasses on the wearer.

U.S. Pat. No. 1,622,668 sets forth on opthalmic mounting and method of construction therefore in which a flexible metallic wire-like temple piece is provided with a rubber-like tubular protective covering. The covering is secured to the temple piece by a cap portion fitted to the end of the temple piece and attached with a cement.

U.S. Pat. No. 3,933,403 sets forth an insulated sheath for eyeglass temples. A protective removeable flexible insulated sheath is employed on the heat softened temples of eyeglasses during the fitting process to prevent injury or discomfort to the wearer. Once the heat formable temple pieces have cooled and set to a stable shape fitted to the wearer, the flexible sheath is removed and discarded.

U.S. Pat. No. 2,502,734 provides an eyeglass temple cover which comprises an elongated flexible sleeve having a central passage and a longitudinal split from its inner passage to exterior surface. The temple cover is applied to the ear engaging portion of the eyeglass temple piece by sliding the temple portion through longitudinal slit in the temple cover.

U.S. Pat. No. 2,436,101 sets forth a replaceable eyeglass temple cover formed of an elastic deformable material and adapted to be slid onto the temple cover piece of the pair of eyeglasses. The temple cover is generally tubular, having an inside diameter sufficient to permit the cover to be placed upon the temple piece, and a constricted end portion which serves to grip the temple piece and secure the temple cover.

U.S. Pat. No. 1,810,220 sets forth a spectacle temple piece including a wire core member covered with a non-metallic tube and provided with an enlargement on the end of the core. The wire projects beyond the tube to lock the tube on the core and to fit a cap member on the end of the tube. An enlarged portion at the end of the core engages the cao and provides thereby a finsiehd end for the covering tube.

French Patent No. 1.579.956 sets forth a generally tubular temple cover of similar construction to that shown in U.S. Pat. No. 2,502,734 described above, in that the generally tubular temple cover includes a central longitudinal passage and a longitudinal slit in the wall of the tubular member for its entire length. The temple cover is placed upon the temple piece of the eyeglass by passing the temple piece through the longitudinal slit to be captivated within the central passage of the temple cover.

While the foregoing described structures in the prior art have, with varying degrees of success, provided improved interfaces for the eyeglass wearer in most normal uses of eyeglasses, there arise additional environments in which eyeglasses are worn which create the need for a disposable inexpensive easily installed and removed temple cover which will protect the temple piece against its environment. Such application may arise for example in the enrironment of a beauty parlor in which the wearer is undergoing a hair or scalp treatment involving the use of chemicals which may be damaging to the material of the temple piece. Similarly, patients being treated by a dermatologists or other physicians treating scalp or head surface disorders may require the patient to remain at the facility for extended periods of time while an applied substance is present on the skin in the region of the eyeglass temple piece or to the scalp. Often, such substances tend to drip or run down the patient onto the eyeglass temple piece. Particularly during treatments or beauty parlor session in which the eyeglass wearer is expected to remain for an extended period of time some hardship is imposed upon the patient or client if the time cannot be passed by reading or other activities for lack of the opportunity for the patient or client to wear his or her eyeglasses for fear of damaging them.

There remains therefore a need in the art for a disposeable inexpensive easy to install and easy to remove temple cover which by its construction will accommodate a wide variety of eyeglass temple piece structures and configurations.

SUMMARY OF THE INVENTION

Accordingly, it is a general object of the present invention to provide an improved removeable cover for use on eyeglass temple pieces. It is a more particular object of the present invention to provide a removeable cover for the temple pieces of eyeglasses which is easy to install and remove and which is sufficiently flexible in design to accommodate a wide variety of eyeglass temple piece structures and configurations.

In accordance with the invention there is provided an eyeglass temple cover having a generally tubular configuration formed of a thin resilient plastic material or the like and defining a longitudinal center passage and first and second ends. A soft resilient plastic ring sufficiently elastic to conform to and captivate the cross section of the eyeglass temple piece is attached to and born by the tubular member. In one embodiment, the soft plastic ring is placed upon the outer surface of the tubular member a short distance from one end thereof. The short portion of the tubular member extending through the soft plastic ring is then rolled back upon the plastic ring to surround it with a plurality of layers of the tubular material. In another embodiment, the short portion of the tubular member extending beyond the soft plastic ring is "flared" and pulled outside and back captivating and overriding the soft plastic ring. In either embodiment, the temple cover thus formed may be placed upon the temple piece of the eyeglass by sliding the temple piece through the central passage of the temple cover. The constricting action of the soft plastic ring captivates and grips the underlying portion of the temple piece and maintains the position of the temple piece cover.

BRIEF DESCRIPTION OF THE DRAWINGS

The features of the present invention which are believed to be novel are set forth with particularly in the appended claims. The invention, together with further objects and advantages thereof, may best be understood by reference to the following description taken in conjunction with the accompanying drawings in the several figures of which like reference numerals identify like elements and in which:

FIG. 1 shows a typical pair of eyeglasses having a temple cover constructed in accordance with the present invention;

FIGS. 2a and 2b show sequential stages of the assembly of the present invention temple cover;

FIG. 3 is a partially sectioned view of the temple portion of the eyeglass shown in FIG. 1 having the present invention temple cover installed;

FIG. 4 is a section view of the present invention temple cover taken along section lines 4—4 in FIG. 2a; and FIG. 5 is a partially sectioned view of an alternate embodiment of the present invention temple cover.

DESCRIPTION OF THE PREFERRED EMBODIMENTS

FIG. 1 is a perspective view of a typical pair of eyeglasses of the type to which the invention pertains, generally referenced by numeral 10, in which a pair of lenses 11 and 12 are attached in a spatial relationship by a nose bridge 13. In accordance with commonly accepted methods of manufacture, nose bridge 13 includes means providing a resting surface for eyeglasses 10 upon the nose bridge of the wearer. A pair of temples 14 and 15 are attached to lenses 11 and 12 and extend backward generally parallel therefrom. Temples 14 and 15 further include respective ear portions 17 and 16 which curve generally downward and terminate in end portions 19 and 18 respectively. In accordance with the present invention, a pair of temple covers 20 are supported upon temples 14 and 15 of eyeglasses 10. The structure and configuration of temple covers 20 are set forth below with greater detail. However, suffice it to say here that temple covers 20 are positioned upon the temples 14 and 15 such that they extend from the portion of the temples attached to the lenses past the point at which temples 14 and 15 would engage the wearer. It should also be noted that while temples 14 and 15 are shown to be full length in FIG. 1 in that they extend the entire length of temples 14 and 15 it will be apparent to those skilled in the art that in any given application the length of temples 20 may be modified to suit the needs of the wearer and the environment in which they are worn without departing from the spirit and scope of the present invention. FIG. 2a shows temple cover 20 in a relaxed position. A resilient, soft elastic ring 23 having a generally torroidal shape is supported by temple cover 20 adjacent one end thereof. A flare 24 is formed in the the portion of temple cover 20 extending beyond ring 23. Flare 24 defines a gradually increasing diameter terminating at end 25 in a substantially greater diameter than the outside diameter of ring 23. during assembly, flare 24 is folded outwardly from the central passage of temple cover 20 to overly and captivate ring 23. This assembly process shown in FIG. 2b. Because temple cover 20 is formed of a thin film-like plastic material of the type which tends to cling to itself, the folded portion of flare 24 which surrounds the surface of temple cover 20 beyond ring 23 clings thereto captivating ring 23. The final configuration, when this assembly is carried forward, is shown more clearly in FIG. 3. FIG. 3 shows temple cover 20 fully assembled upon temple 15 such that flare 24 and ring 23 are positioned near lens 12. As can be seen, temple cover 20 extends away from lens 12 toward end portion 18 of temple 15. As can be seen by examination of FIG. 3, the resilience of ring 23 within flare 24 grips the underlying portion of temple cover 20 thereby attaching temple cover 20 to temple 15. Ring 23, being formed of an elastic material, permits easy assembly onto and removal from temple 15. The installation of temple cover 20 upon temple 15 is carried forward by sliding the end of temple cover 20 which bears ring 23 captivated by flare 24 over end portion 18 across ear portion 16 to the position shown near lens 12 of temple 15. Thereafter, the constricting force supplied by ring 23 grips the surface of temple 15 and retains temple cover 20 thereupon. FIG. 4 shows a section view of temple cover 20 taken along section lines 4—4 of FIG. 2a and more clearly shows center passage 21 passing longitudinally through temple cover 20 and surrounded by tube wall 22. As mentioned above, in the preferred form temple cover 20 is formed of a thin film-like tube. Therefore it should be understood that the drawing figures depict the wall thickness of temple cover 20 much greater than actual size. This is necessary because the thin wall of temple cover 20 could not be printed if actual scale were used. In accordance with an important aspect of the present invention, the assembly of temple cover 20 to temple 15 provides a complete protective covering for temple 15 which is easily installed. After completion of use, temple cover 20 is easily removed in the reverse manner of its assembly by simply sliding temple cover 20 away from lens 12 and off temple 15. FIG. 5 shows an alternate embodiment of the present invention. The embodiment of FIG. 5 differs from that shown in FIGS. 1 through 4 solely in its use of an alternatve method of attaching ring 23 to temple cover 20. In the embodiment of figure 5, the portion of temple cover 20 extending beyond ring 23 is not flared as shown in FIG. 2a, but is of relatively constant diameter. During assembly, the end 25 of temple cover 20 is instead of overlapping as shown in FIG. 3, caused to roll upon ring 23 in multiple layers. The number of layers of temple cover 20 rolled upon ring 23 is a matter of application and choice. However, suffice it to say a sufficient number of layers of temple cover 20 are rolled upon ring 23 to securely embrace it and captivate it. The assembly of temple cover 20 to temple 15 in the embodiment shown in FIG. 5 is carried forward in the same manner as that of FIG. 3 in that the end portion bearing ring 23 is slidably moved onto end portion 18 ear portion 16 to a position proximate lens 13 on temple 15. In similar manner to the embodiment shown in FIG. 3, the constricting force provided by ring 23 provides a gripping force which maintains and secures temple cover 20 upon temple 15. As can be seen, the present invention temple cover is capable of fabrication from inexpensive easy to provide materials and is assembled without the aid of any cements or other affixing materials. Accordingly, the present invention temple cover is fabricated using, for example, an inexpensive roll of tubular plastic or similar elastic material cut to the desired length. The construction of ring 23 is no more difficult or complicated than the construction of conventional rubber "O-rings" used in other applications. It will be apparent to those skilled in the art that the described methods of fabricating temple cover 20 of the thin inexpensive tubular material are made possible by the manner in which ring 23 is attached.

What has beens hown is an inexpensive, easy to fabricate and easy to install and remove temple cover for use in protection of the temple portion of eyeglasses when worn in an environment which would otherwise subject those temple portions to delaterious affects of the fluids present upon the skin or scalp of the wearer.

While particular embodiments of the invention have been shown and described, it will be apparent to those skilled in the art that changes and modifications may be made without departing from the invention in its broader aspects, and, therefore, the aim in the appended claims is to cover all such changes and modifications as fall within the true spirit and scope of the present invention.

What is claimed is:

1. A removable temple covering comprising:
    a hollow tube having a thin wall formed of a plastic material and defining a first end and a second end and a longitudinal passage therebetween; and
    a resilient ring for securing said covering to said temple having a center aperture supported upon and encircling said tube at a point a predetermined distance from said first end, the portion of said tube between said ring and said first end of said tube defining a first end portion of said tube captivating said resilient ring to said tube, said first end portion having an outwardly extending flare of a diameter which increases from the point at which said resilient ring encircles said tube and is folded outwardly from said ring and back upon said tube so as to cling to the underlying portion of said tube to secure said ring upon said tube.

2. A removeable temple covering as set forth in claim 1 wherein said first end portion of said tube is rolled upon said ring and is wrapped upon it in multiple layers.

3. A method of fabricating a temple covering comprising the steps of:
    forming a thin-walled tube of plastic material having a first end and a second end and a longitudinal passage therebetween, said first end having an outwardly extending flare;
    cutting said thin-walled tube to a predetermined length;
    forming a resilient ring having an inside diameter approximately equal to the tube diameter;
    assembling said resilient ring to said tube by passing a portion of said tube through said ring;
    securing said resilient ring upon said tube by causing at least a portion of said tube to foldback and overlie said resilient ring.

4. The method set forth in claim 3 wherein said step of securing includes wrapping the portion of said tube passed through said ring upon said ring by:
    placing said ring close to one end of said tube; and
    rolling said ring upon said tube such that multiple layers of said tube encircle said ring.

5. The method set forth in claim 3 wherein said step of securing includes:
    placing said ring a predetermined distance from one end of said tube;
    folding the portion of said tube between said ring and the end of said tube closest to said ring outwardly and back upon said tube so as to cause the folded portion to overlie and cling to a portion of said tube.

* * * * *